(12) United States Patent
Salter et al.

(10) Patent No.: US 10,235,911 B2
(45) Date of Patent: Mar. 19, 2019

(54) ILLUMINATING BADGE FOR A VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US); Michael A. Musleh, Canton, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/993,719

(22) Filed: Jan. 12, 2016

(65) Prior Publication Data

US 2017/0200403 A1    Jul. 13, 2017

(51) Int. Cl.
| | |
|---|---|
| *B60Q 1/00* | (2006.01) |
| *G09F 21/04* | (2006.01) |
| *B60Q 1/26* | (2006.01) |
| *G09F 13/06* | (2006.01) |
| *G09F 13/20* | (2006.01) |
| *B60R 13/00* | (2006.01) |
| *G09F 13/22* | (2006.01) |
| *F21S 43/13* | (2018.01) |
| *F21V 9/30* | (2018.01) |
| *F21Y 115/10* | (2016.01) |
| *G09F 7/18* | (2006.01) |
| *G09F 13/04* | (2006.01) |

(52) U.S. Cl.
CPC ........... *G09F 21/04* (2013.01); *B60Q 1/0035* (2013.01); *B60Q 1/2615* (2013.01); *B60R 13/005* (2013.01); *F21S 43/13* (2018.01); *F21V 9/30* (2018.02); *G09F 13/06* (2013.01); *G09F 13/20* (2013.01); *G09F 13/22* (2013.01); *F21Y 2115/10* (2016.08); *G09F 2007/1882* (2013.01); *G09F 2013/044* (2013.01)

(58) Field of Classification Search
CPC ............... B60Q 1/26; F21V 9/30; F21V 3/08
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jong-Suk (James) Lee
*Assistant Examiner* — Christopher E Dunay
(74) *Attorney, Agent, or Firm* — Vichit Chea; Price Heneveld LLP (57) ABSTRACT

A badge mounted on a vehicle is provided herein. The badge includes a substrate and a housing attached thereto defining a cavity therebetween. A light source is configured to emit an excitation light. A first photoluminescent structure and a second photoluminescent structure are disposed within the badge and each is configured to convert the excitation light emitted from the light source into a converted light of a different wavelength. A light scattering layer is disposed between the first and second photoluminescent structures.

5 Claims, 7 Drawing Sheets

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,804,103 B1 * | 9/2010 | Zhai .................. H01L 33/504 257/79 |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,752,989 B2 | 6/2014 | Roberts et al. |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2011/0277361 A1 | 11/2011 | Nichol et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0094179 A1 * | 4/2013 | Dai .................. H05B 33/14 362/84 |
| 2013/0287630 A1 * | 10/2013 | Pugia ................ B01L 3/502707 422/68.1 |
| 2013/0335994 A1 | 12/2013 | Mulder et al. |
| 2014/0003044 A1 | 1/2014 | Harbers et al. |
| 2014/0009930 A1 * | 1/2014 | Han .................. H01L 25/0753 362/231 |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0160408 A1 * | 6/2014 | Cho .................. G02F 1/133617 349/110 |
| 2014/0198480 A1 * | 7/2014 | Dai .................. G02B 5/0242 362/84 |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0268840 A1 | 9/2014 | Smith |
| 2014/0362557 A1 * | 12/2014 | Ulasyuk .................. F21K 9/56 362/84 |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0175057 A1 | 6/2015 | Salter et al. |
| 2015/0267881 A1 | 9/2015 | Salter et al. |
| 2015/0307033 A1 | 10/2015 | Preisler et al. |
| 2015/0308635 A1 * | 10/2015 | Li .................. H01L 33/502 362/84 |

(56) References Cited

U.S. PATENT DOCUMENTS

| | | |
|---|---|---|
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0250327 A1* | 8/2017 | Hsieh .................. H01L 33/60 |
| 2017/0253179 A1 | 9/2017 | Kumada |

FOREIGN PATENT DOCUMENTS

| | | |
|---|---|---|
| CN | 201193011 Y | 2/2009 |
| CN | 101890822 A | 11/2010 |
| CN | 202944278 U | 5/2013 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 02090824 A1 | 11/2002 |
| WO | 2006047306 A1 | 5/2006 |
| WO | 2014068440 A1 | 5/2014 |
| WO | 2014161927 A1 | 10/2014 |

\* cited by examiner

ILLUMINATING BADGE FOR A VEHICLE

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge for a vehicle is disclosed. The badge includes a substrate and a housing attached thereto that defines a cavity therebetween. A light source is configured to emit an excitation light. A first photoluminescent structure and a second photoluminescent structure are each configured to convert the excitation light emitted from the light source into a converted light of a different wavelength. A light scattering layer is disposed between the first and second photoluminescent structures.

According to another aspect of the present invention, a badge is disclosed. The badge includes a housing and a substrate. A light source is configured to emit an excitation light toward a viewable portion. A first photoluminescent structure is disposed rearwardly of the viewable portion and is configured to emit a converted light at a different wavelength in response to receiving the excitation light. A light scattering layer is disposed between the first photoluminescent structure and the viewable portion.

According to another aspect of the present invention, a method of illuminating a badge is disclosed. The method includes activating a light source thereby emitting an excitation light at a first wavelength. Next, the method includes converting and diffusing excitation light emitted from the light source to converted light of a second wavelength as the light passes through a first photoluminescent structure. The excitation light and converted light are then diffused through a light scattering layer. The light at the first or second wavelength is then converted to a third wavelength as the light passes through a second photoluminescent structure to a third wavelength. Lastly, the light at the third wavelength is directed outwardly through a viewable portion of the badge.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminating badge for a vehicle. The badge may advantageously employ one or more light sources configured to illuminate at pre-defined frequencies. The badge may further include one or more photoluminescent structures configured to convert excitation light received from an associated light source to a converted light at a different wavelength typically found in the visible spectrum.

Figure 1A:
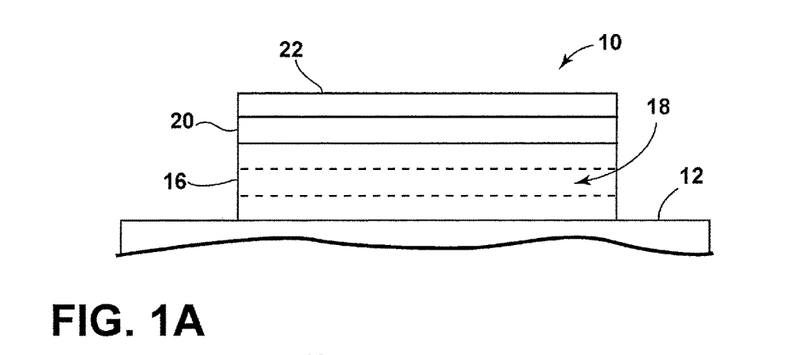
FIG. 1A is a side view of a photoluminescent structure rendered as a coating for use in a vehicle badge according to one embodiment.
Figure 1B:
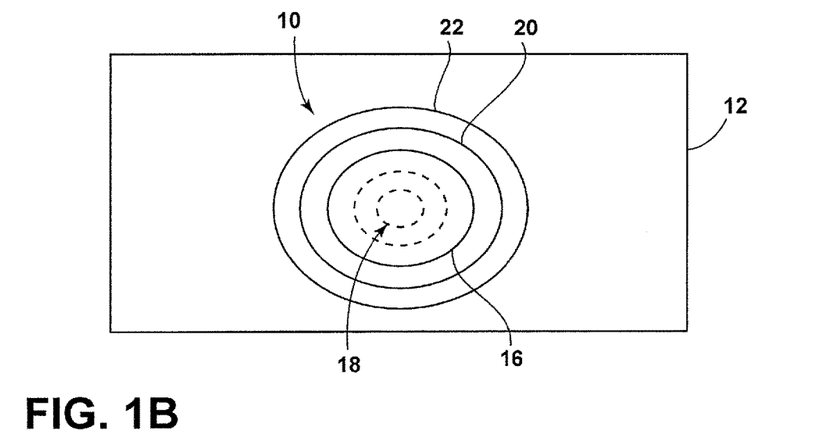
FIG. 1B is a top view of a photoluminescent structure rendered as a discrete particle according to one embodiment.
Figure 1C:
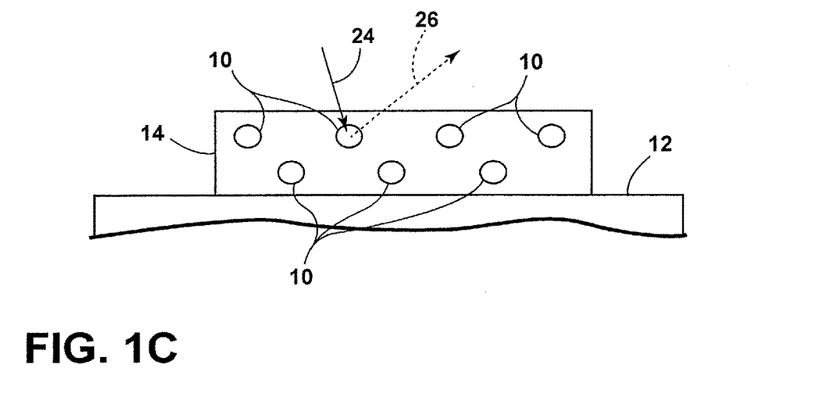
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown in broken lines in FIGS. 1A and 1B. Each sub layer of the energy conversion layer 16 may include one or more photoluminescent materials 18 having energy converting elements with phosphorescent or fluorescent properties. Each photoluminescent material 18 may become excited upon receiving an excitation light 24 (FIG. 1C) of a specific wavelength, thereby causing the light to undergo a conversion process. Under the principle of down conversion, the excitation light 24 is converted into a longer wavelength light that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 42 is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium 14. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

The photoluminescent material 18, according to one embodiment, disposed within the photoluminescent structure 10 may include a long persistent phosphorescent material that emits the converted light 26, once charged by the excitation light 24. The excitation light 24 may be emitted from any excitation source (e.g., any natural and/or artificial light source). The long persistent phosphorescent material may be defined as being able to store an excitation light 24 and release the converted light 26 gradually, for a period of several minutes or hours, once the excitation light 24 is no longer present. The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The long persistent phosphorescent material, according to one embodiment, may be operable to emit light at or above an intensity of 0.32 mcd/m² after a period of 10 minutes. Additionally, the long persistent phosphorescent material may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistent phosphorescent material may continually illuminate in response to excitation from a plurality of light sources that emit an excitation light 24, including, but not limited to, natural light sources (e.g., the sun) and/or any artificial light source 42. The periodic absorption of the excitation light 24 from any excitation source may provide for a substantially sustained charge of the long persistent phosphorescent material to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistent phosphorescent material may correspond to alkaline earth aluminates and silicates, for example doped di-silicates, or any other compound that is capable of emitting light for a period of time once an excitation light 24 is no longer present. The long persistent photoluminescent material 18 may be doped with one or more ions, which may correspond to rare earth elements, for example, $Eu^{2+}$, $Tb^{3+}$, and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from an excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long long persistent phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistent phosphor known in the art may also be utilized without departing from the teachings provided herein.

Additional information regarding the production of long persistent photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
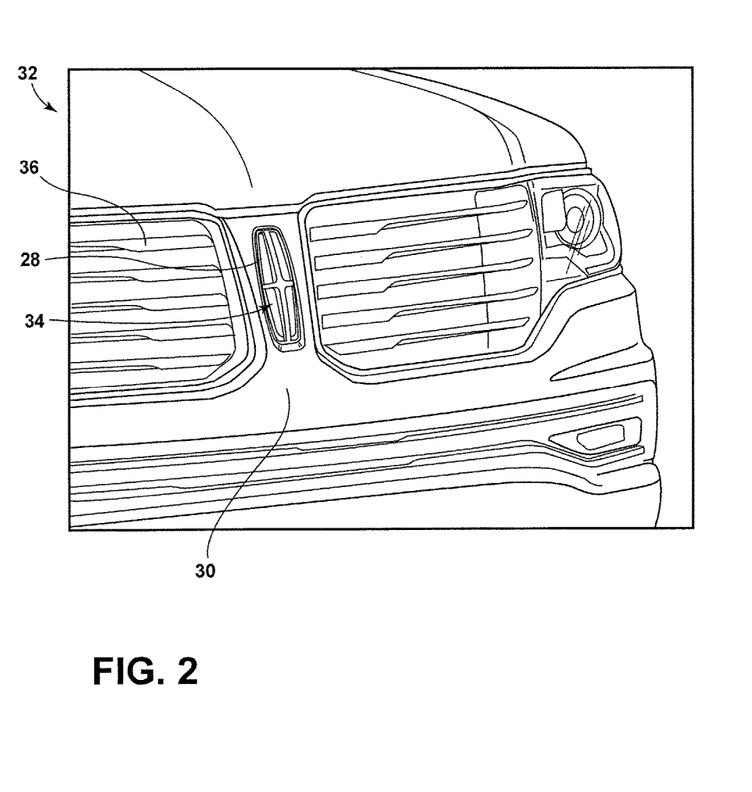
FIG. 2 illustrates a badge mounted to a front portion of a vehicle.

Referring to FIG. 2, a badge 28 is generally shown mounted on a front portion 30 of a vehicle 32. In other embodiments, the badge 28 may be located elsewhere, such as, but not limited to, the rear portion or side portion(s) of the vehicle 32. Alternatively, the badge 28 may be disposed inside the vehicle 32. The badge 28 may be configured as an insignia that is presented as an identifying mark of a vehicle manufacturer and includes a viewable portion 34 that may be generally prominently displayed on the vehicle 32. In the presently illustrated embodiment, the badge 28 is disposed proximate a grille assembly 36 in a central location of the front portion 30, thus allowing the badge 28 to be readily viewed by an observer looking head on at the vehicle 32. As will be described below in greater detail, the badge 28 may illuminate to provide a distinct styling element to the vehicle 32.

Figure 3:
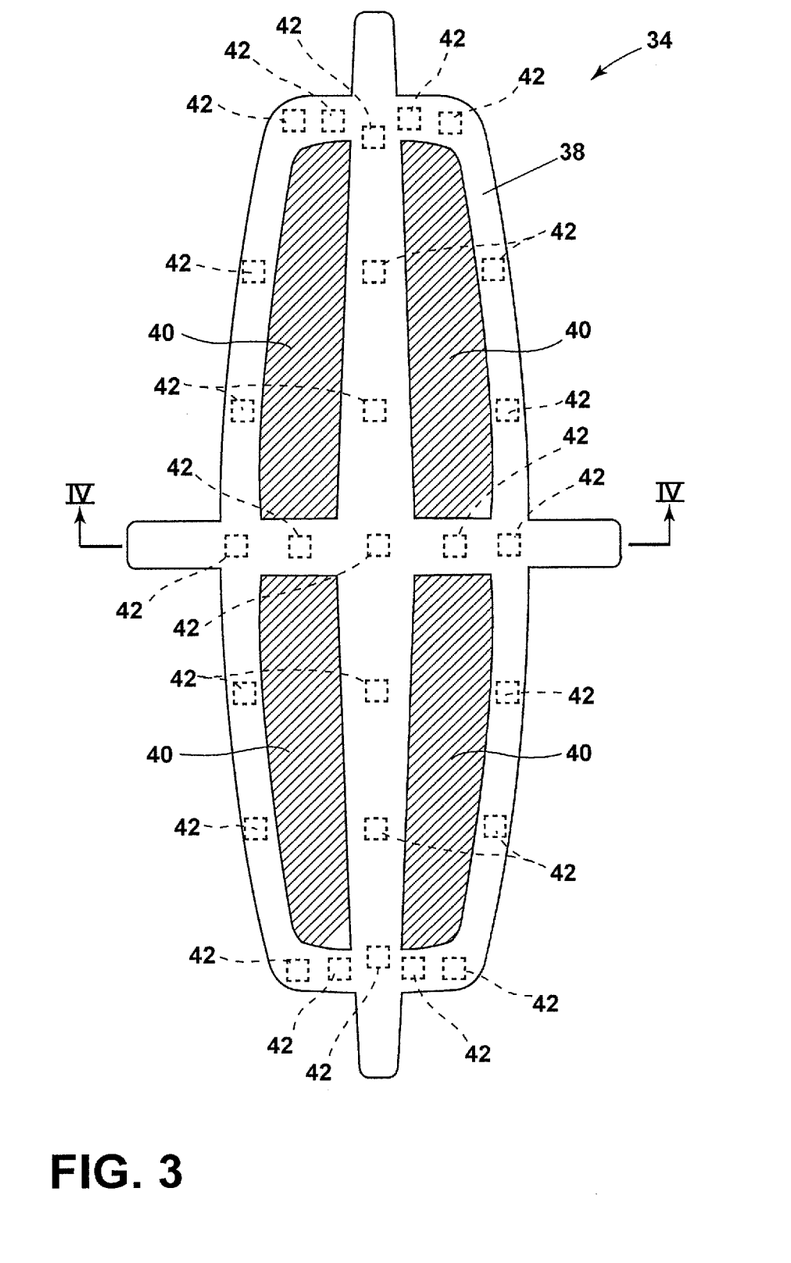
FIG. 3 is a front view of the badge, according to one embodiment, having a light source therein.

Referring to FIG. 3, the viewable portion 34 of the badge 28 is exemplarily shown according to one embodiment. The viewable portion 34 may include a transparent and/or translucent portion 38 and substantially opaque portions 40, which may be configured as opaque coatings applied to the viewable portion 34. In alternative embodiments, the opaque portions 40 may be left open to the front end 24 of the vehicle 32. The badge 28 may also include one or more light sources 42 disposed inside the badge 28. The light sources 42 may be configured as light emitting diodes (LEDs) emitting a wavelength of light that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs. Additionally, the light source 42 may include LEDs that are printed onto an interior surface of the badge 28 and configured to direct light towards the viewable portion 34. Additional information regarding the construction of vehicle components incorporating printed LEDs therein is disclosed in U.S. patent application Ser. No. 14/851,726 to Salter et al., entitled "ILLUMINATED STEERING ASSEMBLY," filed Sep. 11, 2015, the entire disclosure of which is hereby incorporated herein by reference.

Additionally, any light source 42 within the badge 28 may be configured to sparkle. The locations of the light sources 42 that sparkle may be chosen to correspond to a corner or edge of the viewable portion 34. The sparkle effect at each location may be produced by light emitted from a corresponding light source 42 that is disposed inside the badge 28. Each light source 42 may be operated to pulse light onto the corresponding sparkle location. According to one embodiment, a pulse of light from a given light source 42 may last approximately 1/10 to 1/100 of a second and the light sources 42 may be pulsed randomly or in a pattern.

The light sources 42 may be configured as LEDs to emit a wavelength of light that does not excite the photoluminescent structure 10 and is instead transmitted through the photoluminescent structure 10 to directly illuminate the corresponding sparkle locations on portion 38. Alternatively, the light sources 42 may be configured to excite a second photoluminescent structure 54 such that the viewable portion 34 may illuminate in a plurality of colors.

Figure 4:
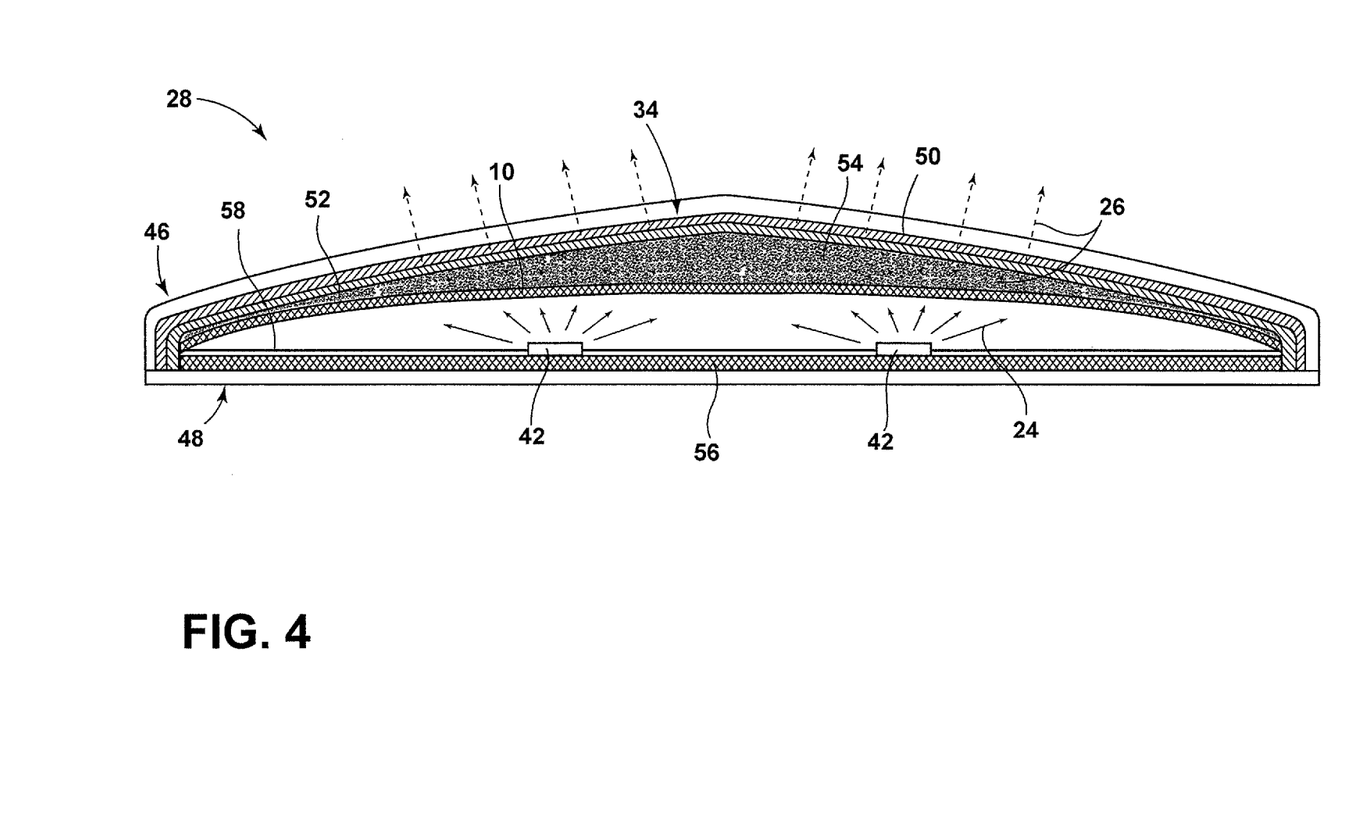
FIG. 4 is a cross-sectional view of the badge taken along line IV-IV of FIG. 3 having a plurality of photoluminescent structures and a light scattering layer that includes glass particles disposed within the badge, according to one embodiment.

Referring to FIG. 4, a cross-sectional view of the badge 28 is shown according to one embodiment. The badge 28 includes a housing 46 having the viewable portion 34 described above and a substrate 48 that may be capable of being secured to the vehicle 32. The viewable portion 34 may be arcuate whereas the substrate 48 may be substantially linear. The housing 46 and/or the substrate 48 may be constructed from a rigid material such as, but not limited to, plastic and may be assembled together via sonic or laser welding. Alternatively, the housing 46 and the substrate 48 may be assembled together via low-pressure insert molding. Alternatively still, the housing 46 and the substrate 48 may be integrally formed as a single component.

With respect to the illustrated embodiment, a first photoluminescent structure 10 may be disposed above the light sources 42 that may be secured inside the housing 46. The first photoluminescent structure 10 may be configured to emit the converted light 26 in response to the excitation light 24 received from the light sources 42. The light sources 42 may be provided on a flexible printed circuit board (PCB) 56. Optionally, the light sources 42 may include focusing optics to help concentrate light onto pre-defined locations. The light sources 42 may be provided on a PCB 56 that is secured to the substrate 48. The PCB 56 may include a white solder mask 58 to reflect light incident thereon.

According to one embodiment, the excitation light 24 emitted from the light source(s) 42 is converted by the photoluminescent structure 10 into light of a longer wavelength and outputted therefrom. The converted light 26 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structure 10 may be configured such that the converted light 26 outputted therefrom is capable of being expressed as unicolored or multicolored light. According to one embodiment, the light sources 42 are configured to emit blue light and the photoluminescent structure 10 is configured to convert the blue light into a neutral white light having a color temperature of approximately 4000K to 5000K. The converted light 26 escapes from the badge 28 via the viewable portion 34. To obtain a uniform illumination of portion 38, light sources 42 may be configured to emit non-focused light and are spaced accordingly inside the badge 28 to provide a substantially even distribution of light for exciting the photoluminescent structure 10.

A light scattering layer 52 may be disposed above the first photoluminescent structure 10 and is molded, or alternatively mounted, within the badge 28. The light scattering layer 52 may include clear, translucent, and/or opaque portions and may be colored and desired color. The light scattering layer 52 generally functions to diffuse the excitation light 24 emitted from the light sources 42 and/or converted light 26 emitted from the first photoluminescent structure 10 so that hot spots and shadows are eliminated.

According to one embodiment, the light scattering layer 52 may include glass particles that provide additional light scattering effects to further enhance the attractiveness of the badge 28.

The light scattering layer 52 may be coated with a curable, liquid-based coating that results in a translucent layer for added durability. The diffusive layer may be fabricated according to various methods as known in the art. For example, the light scattering layer 52 may be made using injection molding tools, equipment, and processing conditions. Further, the light scattering layer 52 is attached to the housing 46 and/or the substrate 48 via various mechanical, chemical, and/or thermal techniques that provide a durable seal therebetween. These attachment techniques include, but not limited to, sonic welding, vibration welding, hot plate welding, rotational welding, and adhesive joining.

The second photoluminescent structure 54 may be disposed above the light scattering layer 52. The second photoluminescent structure 54 may contain a long persistent material, as described above. The second photoluminescent structure 54 may substantially protect the light scattering layer 52 from UV degradation such that the light scattering layer 52 may not need a UV stabilizer in some embodiments. Moreover, in some embodiments, the second photoluminescent structure 54 may be molded or otherwise integrated into the viewable portion 34 of the housing 46.

According to one embodiment, the first and second photoluminescent structures 10, 54 are substantially Lambertian, that is, the apparent brightness of the first and second photoluminescent structures 10, 54 is substantially constant regardless of an observer's angle of view. As a consequence, the converted light 26 may be emitted outwardly from the first and second photoluminescent structures 10, 54 in numerous directions. With respect to the embodiment shown in FIG. 4, a portion of the converted light 26 may be transmitted through the metallic layer 50 and outputted from the viewable portion 34. Another portion of the converted light 26 may be emitted into the interior of the housing 46 and become incident on the white solder mask 58 of the PCB 56. As a result, the converted light 26 may be redirected back toward the photoluminescent structure 10 and transmitted there through. Furthermore, the provision of the white solder mask 58 on PCB 56 also helps to ensure that an optimal amount of light emitted from light sources 42 reaches the photoluminescent structure 10. For example, it is possible for a portion of the light emitted from one or more of the light sources 42 to reflect off the photoluminescent structure 10, thereby resulting in decreased excitation of the photoluminescent structure 10. Thus, by providing a means to redirect the light back toward the photoluminescent structure 10, wayward propagating light originating from light sources 42 and contained inside the housing 46 is given another opportunity to excite the photoluminescent structure 10.

Referring still to FIG. 4, portions of the housing 46 and the substrate 48 that are readily visible (e.g., the viewable portion 34) may be colored any color or may be metalized. For example, a metallic layer 50 may be applied to the underside of the viewable portion 34 via partial vacuum deposition. According to an alternate embodiment, the metallic layer 50 may be applied to any portion of the housing 46 or the substrate 48 via electroplating a thin layer of chromium thereon. Alternatively still, an imitator of chrome may be used for aesthetic purposes. The metallic layer 50 or some portion thereof may be transparent and/or translucent to allow light to pass therethrough.

The excitation light 24 emitted from the light sources 42 and the converted light 26 emitted from the first photoluminescent structure 10 is directed through the light scattering layer 52. The converted light 26 and the excitation light 24 are then directed through the second photoluminescent structure 54, the metallic layer 50, and finally through the viewable portion 34 of the housing 46. Thus, according to the embodiment of FIG. 4, the first photoluminescent structure 10 may diffuse the converted light 26 emitted therefrom and/or excitation light 24 emitted from the light sources 42. The light scattering layer 52 may further diffuse the light thereby acting as a second diffuser. Additionally, the second photoluminescent structure 54 may further diffuse the light emitted therefrom and/or therethrough to form a third diffuser. Through the use of a plurality of diffusers, the badge 28 may appear to have significant depth and/or uniform illumination to an onlooker.

Figure 5:
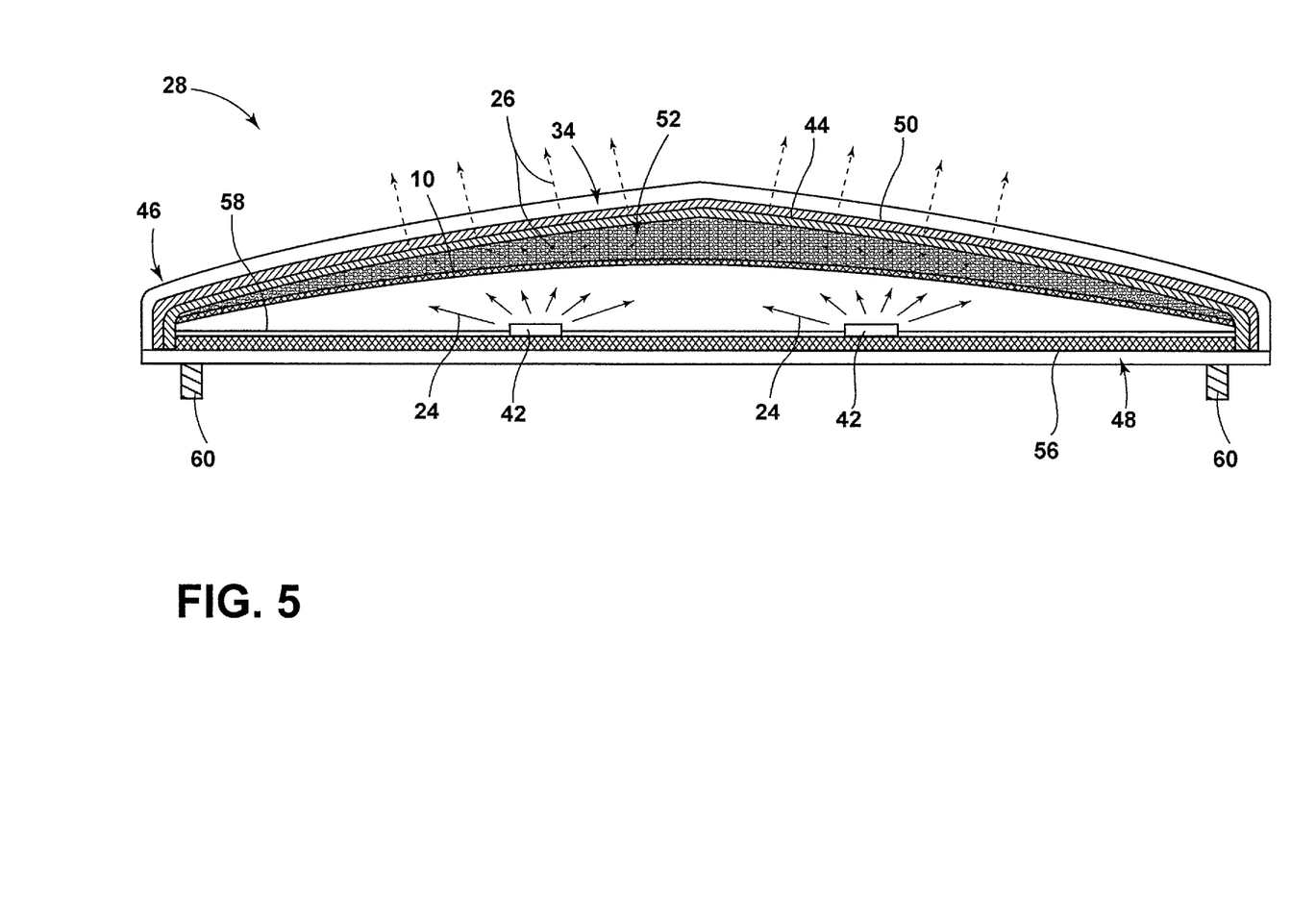
FIG. 5 illustrates a cross-sectional view of an alternate embodiment of the badge taken along line IV-IV of FIG. 3 having a light scattering layer that includes a plurality of beads, according to one embodiment.

Referring to FIG. 5, a cross-sectional view of the badge 28 is shown according to an alternate embodiment taken along the line IV-IV of FIG. 3. As described above, the badge 28 includes the substrate 48 that is capable of being secured to a vehicle 32 through attachment points 60. Any practicable means may be used for attaching the badge 28 to the vehicle 32 including, but not limited to, fasteners, adhesives, welding, integrally forming the badge 28 with a vehicle component, and/or any other method known in the art. The substrate 48 may be a dark, high gloss material, thereby concealing any circuitry of the badge 28 and attachment points 60.

As illustrated in FIG. 5, the light scattering layer 52 is configured as a plurality of beads. The beads may be formed from a glass and/or a polymeric material. The beads, according to one embodiment, are substantially mono dispersed in size and/or shape. According to an alternate embodiment, the beads may be configured in a variety of sizes and/or shapes that are randomly distributed within the light scattering layer 52. Additionally, or alternatively, the first and/or the second photoluminescent structure(s) 10, 54 may be disposed within the beads.

Accordingly, the light emitted from the light sources 42 may be directed through the first photoluminescent structure 10 to act as a first diffuser. The micro-faceted surface may further diffuse the light. Next, the light scattering layer 52 may further diffuse the light thereby creating a third diffuser. The second photoluminescent structure 54 may then function as a fourth diffuser prior to the outputted light exiting the viewable portion 34 of the badge 28.

Figure 6:
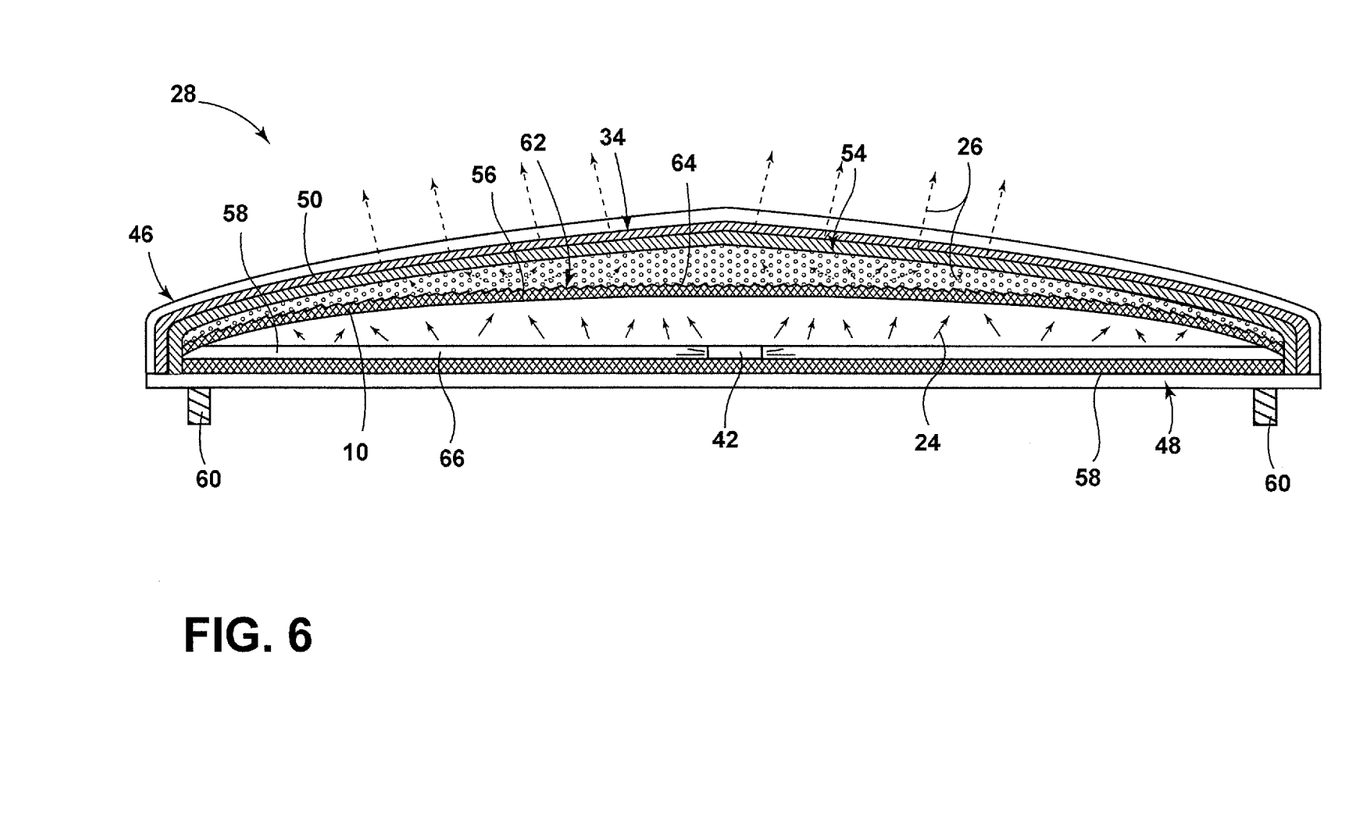
FIG. 6 illustrates a cross-sectional view of an alternate embodiment of the badge taken along line IV-IV of FIG. 3 showing a badge that includes a translucent internal member having a micro-faceted surface for further diffusing light emitted from the light source.

Referring to FIG. 6, a cross-sectional view of the badge 28 is shown according to one embodiment taken along the line IV-IV of FIG. 3. As illustrated, the second photoluminescent structure 54 is integrated into a transparent and/or translucent elongated member 62 above the light sources 42. The elongated member 62 may have a surface 64 that is coated, roughened, and/or micro-faceted to aid in the light diffusion performance. The roughened surface 64 may create an additional light diffusing effect in replacement of or in conjunction with the light diffusing components described above, including, but not limited to, the first and second photoluminescent structures 10, 54 and the light scattering layer 52.

Additionally, the elongated member 62 can also be curved, such as the outwardly curving or concave shape shown in FIG. 6 in order to optimize the light diffusing effect. In alternate embodiments, a light diffusing material may be applied to or disposed on some or all of the light sources 42 disposed within the badge 28.

As illustrated in FIG. 6, the light source 42 may be operably coupled with an optical grade light guide 66, which is a substantially transparent or translucent guide suitable for transmitting light. The light guide 66 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 66.

Further, the light guide 66 may be a flexible light guide 66, wherein a suitable flexible material is used to create the light guide 66. Such flexible materials include urethanes, silicone, thermoplastic polyurethane (TPU), or other like optical grade flexible materials. Whether the light guide 66 is flexible or rigid, the light guide 66, when formed, is substantially optically transparent and/or translucent and capable of transmitting light. The light guide 66 may be referred to as a light pipe, a light plate, a light bar or any other light carrying or transmitting substrate made from a clear or substantially translucent plastic. Known methods of attaching the light guide 66 to the member 48 include the bonding of a preformed light guide 66 within the badge 28 by adhesion, such as by using a double-sided tape, or by mechanical connections such as brackets that are formed into the substrate 48.

Alternatively, the substrate 48 and light guide 66 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create portions of the light guide 66, which may be integrally formed with the light source 42. Additional optics may also be molded into the light guide 66 during the multi-material injection molding process. Initially, the substrate 48 may be formed through a first injection molding step, or through successive steps, if necessary. A light guide 66 is then molded and coupled to the substrate 48 in a second injection molding step. Integrally forming portions of the light guide 66 while encapsulating the light source 42 may protect the light guide 66 and/or additional components from physical and chemical damage arising from environmental exposure.

In alternative embodiments, additional components may be added during one of the injection steps, or successively added in additional injections to adhere more components to the substrate 48. In some embodiments, the light guide 66 may have a photoluminescent material 18 applied thereto or therein.

In operation, the light source(s) 42 may emit excitation light 24 at a first and/or the second wavelength, thereby exciting the first and/or the second photoluminescent structures 10, 54. The converted light 26 emitted from the first and/or the second photoluminescent structures 10, 54 may blend thereby emitting an outputted light in a wide range of colors. For example, a substantially white light may be outputted from the badge 28. In an alternative embodiment, the first and second photoluminescent structures 10, 54 may blend in any color necessary to remove any natural color hue of the badge 28 based on the material used to create the badge 28. For example, plastics such as polycarbonate may naturally have a yellowish hue. However, this hue may be masked through the use of the first and/or the second photoluminescent structures 10, 54 thereby making the badge 28 illuminate and appear in any desired color. Alternatively, any type of light source, multicolored or unicolored, may be utilized to make the badge 28 illuminate in any desired color without the utilization of the first and/or the second photoluminescent structures 10, 54.

Figure 7:
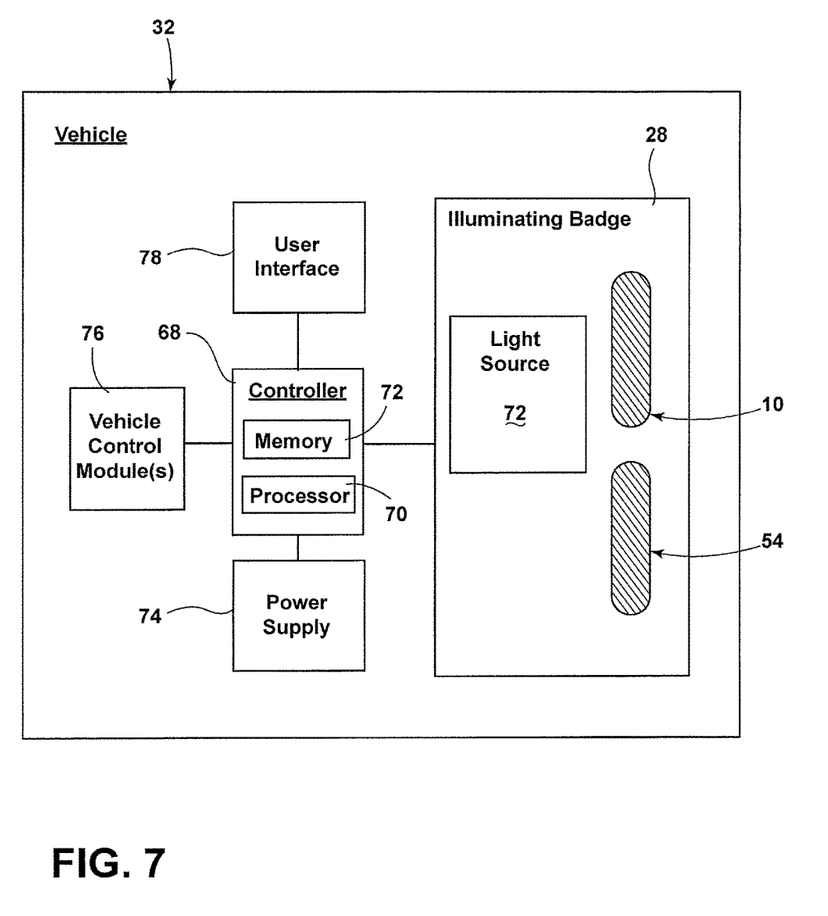
FIG. 7 is a block diagram of the vehicle and the badge.

Referring to FIG. 7, a block diagram of a vehicle 32 is generally shown in which the badge 28 is implemented. The badge 28 includes a controller 68 in communication with the light source 42. The controller 68 may include memory 72 having instructions contained therein that are executed by a processor 70 of the controller 68. The controller 68 may provide electrical power to the light source 42 via a power supply 74 located onboard the vehicle 32. In addition, the controller 68 may be configured to control the excitation light 24 emitted from each light source 42 within the badge 28 based on feedback received from one or more vehicle control modules 76 such as, but not limited to, a body control module, engine control module, steering control module, brake control module, the like, or a combination thereof. By controlling the light output of the light source 42, the badge 28 may illuminate in a variety of colors and/or patterns to provide an aesthetic appearance, such as a prismatic appearance, or may provide vehicle information to an intended observer. For example, the illumination provided by the badge 28 may be used for numerous vehicle applications, such as, but not limited to, a car finding feature, a remote start indicator, a door lock indicator, a door ajar indicator, a running light etc.

In operation, the first and/or the second photoluminescent structures 10, 54 receive the excitation light 24 and, in response, emits the converted light 26 therefrom. The first and/or the second photoluminescent structure(s) 10, 54 may contain long persistent phosphorescent material such that the photoluminescent structure 10, 54 continues to emit the converted light 26 for a period of time after the excitation light 24 is no longer present. For example, according to one embodiment, the first and/or the second photoluminescent structure 10, 54 may continue to emit light for eight hours after the removal of the excitation light 24.

In an alternate embodiment, the light source 42 may pulse light at predefined times, such as every five minutes, to re-excite the phosphorescent material disposed within the first and/or the second photoluminescent structures 10, 54 to continuously emit the converted light 26 above a pre-defined intensity therefrom. The controller 68 may pulse light from any light source 42 at any frequency without departing from the teachings provided herein.

The photoluminescent structure(s) 10, 54 may exhibit periodic unicolor or multicolor illumination. For example, the controller 68 may prompt the light source 42 to periodically emit only the first wavelength of excitation light 24 to cause the first photoluminescent structure 10 to periodically illuminate in the first color. Alternatively, the controller 68 may prompt the light source 42 to periodically emit only the second wavelength of excitation light 24 to cause the second photoluminescent structure 54 to periodically illuminate in the second color. Alternatively, the controller 68 may prompt the light source 42 to simultaneously and periodically emit the first and second wavelengths of excitation light 24 to cause the first and second photoluminescent structures 10, 54 to simultaneously illuminate in a third color defined by an additive light mixture of the first and second colors. Alternatively still, the controller 68 may prompt the light source 42 to alternate between periodically emitting the first and second wavelengths of excitation light 24 to cause the first and second photoluminescent structures 10, 54 to periodically illuminate by alternating between the first and second colors. The controller 68 may prompt the light source 42 to periodically emit the first and/or the second wavelengths of excitation light 24 at a regular time interval and/or an irregular time interval.

In another embodiment, the badge 28 may include a user interface 78. The user interface 78 may be configured such that a user may control the wavelength of excitation light 24 that is emitted by the light source 42. Such a configuration may allow a user to control the illumination patterns of the badge 28.

With respect to the above examples, the controller 68 may modify the intensity of the emitted first and second wavelengths of excitation light 24 by pulse-width modulation or current control. Also, the controller 68 may vary power to each light source 42 from 1 to 5 times steady state current to vary the color and brightness of each illumination. The controller 68 may also illuminate multiple colors within a single multicolored light source 42 concurrently, thereby producing additional color configurations.

In some embodiments, the controller 68 may be configured to adjust a color of the emitted light by sending control signals to adjust an intensity or energy output level of the light source 42. For example, if the light source(s) 42 are configured to emit excitation light 24 at a low level, substantially all of excitation light 24 may be converted to the converted light 26 by the first and/or the second photoluminescent structures 10, 54. In this configuration, a color of light corresponding to the converted light 26 may correspond to the color of the emitted light from the badge 28. If the light source(s) 42 are configured to emit excitation light 24 at a high level, only a portion of the excitation light 24 may be converted to the converted light 26 by the first and/or the second photoluminescent structures 10, 54. In this configuration, a color of light corresponding to mixture of the excitation light 24 and the converted light 26 may be output as the emitted light. In this way, the controller 68 may control an output color of the emitted light.

Though a low level and a high level of intensity are discussed in reference to the excitation light 24, it shall be understood that the intensity of the excitation light 24 may be varied among a variety of intensity levels to adjust a hue of the color corresponding to the emitted light from the badge 28. The variance in intensity may be manually altered, or automatically varied by the controller 68 based on predefined conditions. According to one embodiment, a first intensity may be output from the badge 28 when a light sensor senses daylight conditions. A second intensity may be output from the badge 28 when the light sensor determines the vehicle 32 is operating in a low light environment.

As described herein, the color of the converted light 26 may be significantly dependent on the particular photoluminescent materials 18 utilized in the first and second photoluminescent structures 10, 54. Additionally, a conversion capacity of the first and second photoluminescent structures 10, 54 may be significantly dependent on a concentration of the photoluminescent material 18 utilized in the photoluminescent structures 10, 54. By adjusting the range of intensities that may be output from the light source(s) 42, the concentration, types, and proportions of the photoluminescent materials 18 in the photoluminescent structures 10, 54 discussed herein may be operable to generate a range of color hues of the emitted light by blending the excitation light 24 with the converted light 26. Moreover, the first and second photoluminescent structures 10, 54 may include a wide range of photoluminescent materials 18 that are configured to emit the converted light 26 for varying lengths of time.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge for a vehicle, comprising:
   a substrate and a housing attached thereto defining a cavity therebetween;
   first and second light sources disposed within the cavity and configured to emit an excitation light;
   a first photoluminescent structure disposed between the light source and a viewable portion and separated from the light source by a gap, the gap having a varied thickness;
   a second photoluminescent structure disposed between the first photoluminescent structure and the viewable portion and extending to a position rearwardly of the light source, wherein the first and second photoluminescent structures are configured to convert the excitation light into a converted light of a different wavelength; and
   a light scattering layer having a varied thickness and disposed between the first and second photoluminescent structures, a maximum thickness of the light scattering layer disposed between the first and second light sources.

2. The badge for a vehicle of claim 1, wherein the light source is operably coupled with a circuit board, the circuit board disposed within the cavity and having a solder mask on an internal surface of the circuit board.

3. The badge for a vehicle of claim 2, wherein the first photoluminescent structure and the second photoluminescent structure each include at least one photoluminescent material therein configured to down convert an excitation light received from at least a portion of the light sources into a visible converted light.

4. The badge for a vehicle of claim 1, further comprising:
   a translucent metallic layer disposed between the second photoluminescent structure and the housing.

5. The badge for a vehicle of claim 1, wherein the light source is configured to emit the excitation light at a plurality of independent wavelength ranges, wherein the first photoluminescent structure is excited by a first wavelength range and the second photoluminescent structure is excited by a second wavelength range such that the first and second photoluminescent structures may be independently excited based on the independent wavelength range emitted from the light source.

* * * * *